United States Patent
Kuznicki et al.

[11] Patent Number: 5,989,316
[45] Date of Patent: Nov. 23, 1999

[54] SEPARATION OF NITROGEN FROM MIXTURES THEREOF WITH METHANE UTILIZING BARIUM EXCHANGED ETS-4

[75] Inventors: Steven M. Kuznicki, Whitehouse Station; Valerie A. Bell, Edison; Ivan Petrovic, Princeton; Patrick W. Blosser, Windsor, all of N.J.

[73] Assignee: Engelhard Corporation, Iselin, N.J.

[21] Appl. No.: 08/996,298

[22] Filed: Dec. 22, 1997

[51] Int. Cl.$^6$ .............................. B01D 53/02; C01B 33/24
[52] U.S. Cl. .............................................. 95/130; 423/331
[58] Field of Search ...................... 95/130, 326; 423/331

[56] References Cited

U.S. PATENT DOCUMENTS

| | | | |
|---|---|---|---|
| 4,853,202 | 8/1989 | Kuznicki | 423/326 |
| 4,938,939 | 7/1990 | Kuznicki | 423/326 |
| 4,964,889 | 10/1990 | Chao | 55/58 |
| 5,346,535 | 9/1994 | Kuznicki | 95/96 |
| 5,453,263 | 9/1995 | Blosser et al. | 423/713 |
| 5,616,170 | 4/1997 | Ojo et al. | 95/130 |
| 5,669,958 | 9/1997 | Baker et al. | 95/50 |

FOREIGN PATENT DOCUMENTS

WO 93/00152  1/1993  European Pat. Off. .

OTHER PUBLICATIONS

Abstract of JP 6312317A, May 27, 1988.

*Primary Examiner*—Wayne Langel

[57] ABSTRACT

Barium-exchanged ETS-4 shows particular utility in gas separation processes involving the separation of nitrogen from a mixture of the same with methane.

3 Claims, 2 Drawing Sheets

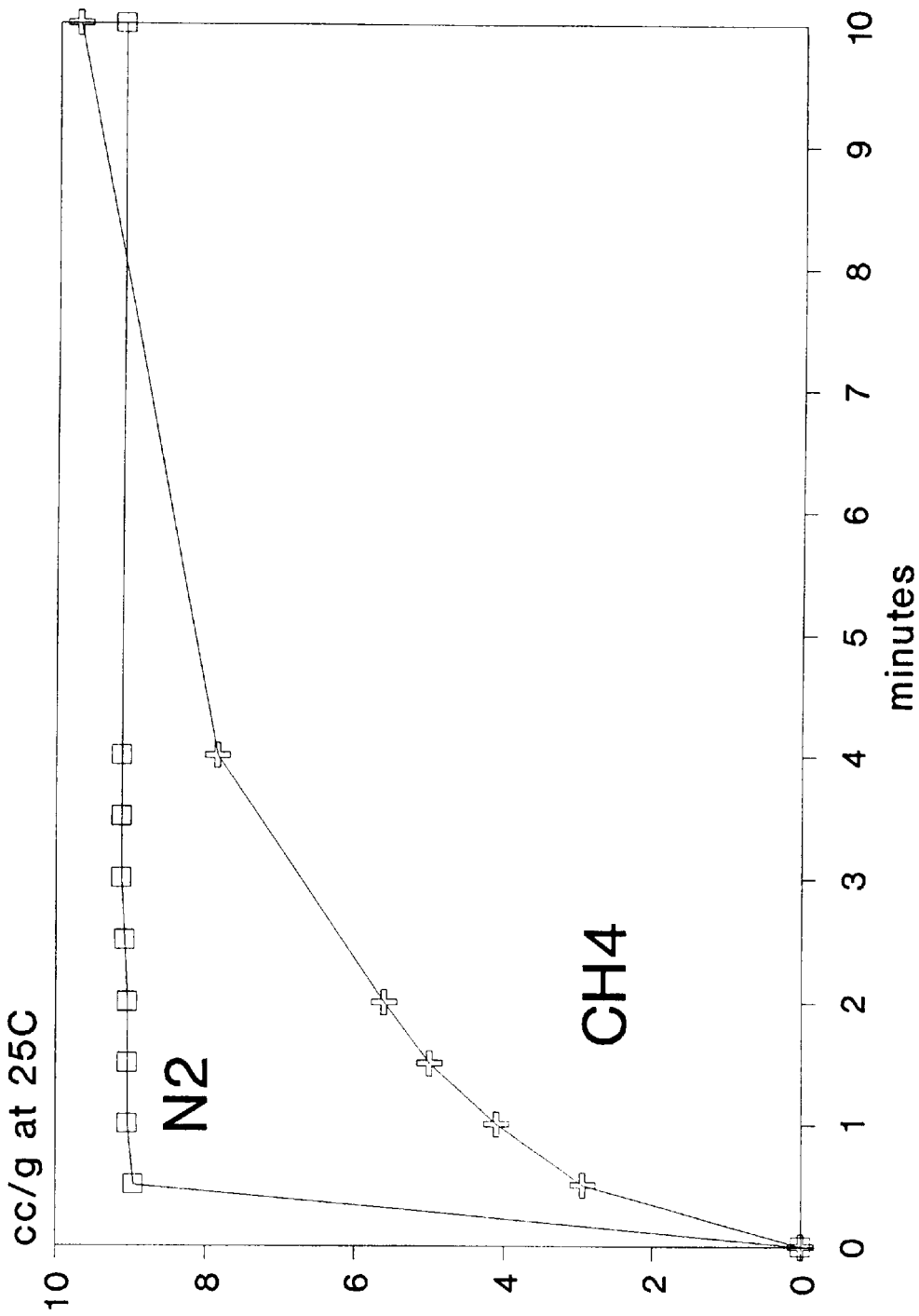

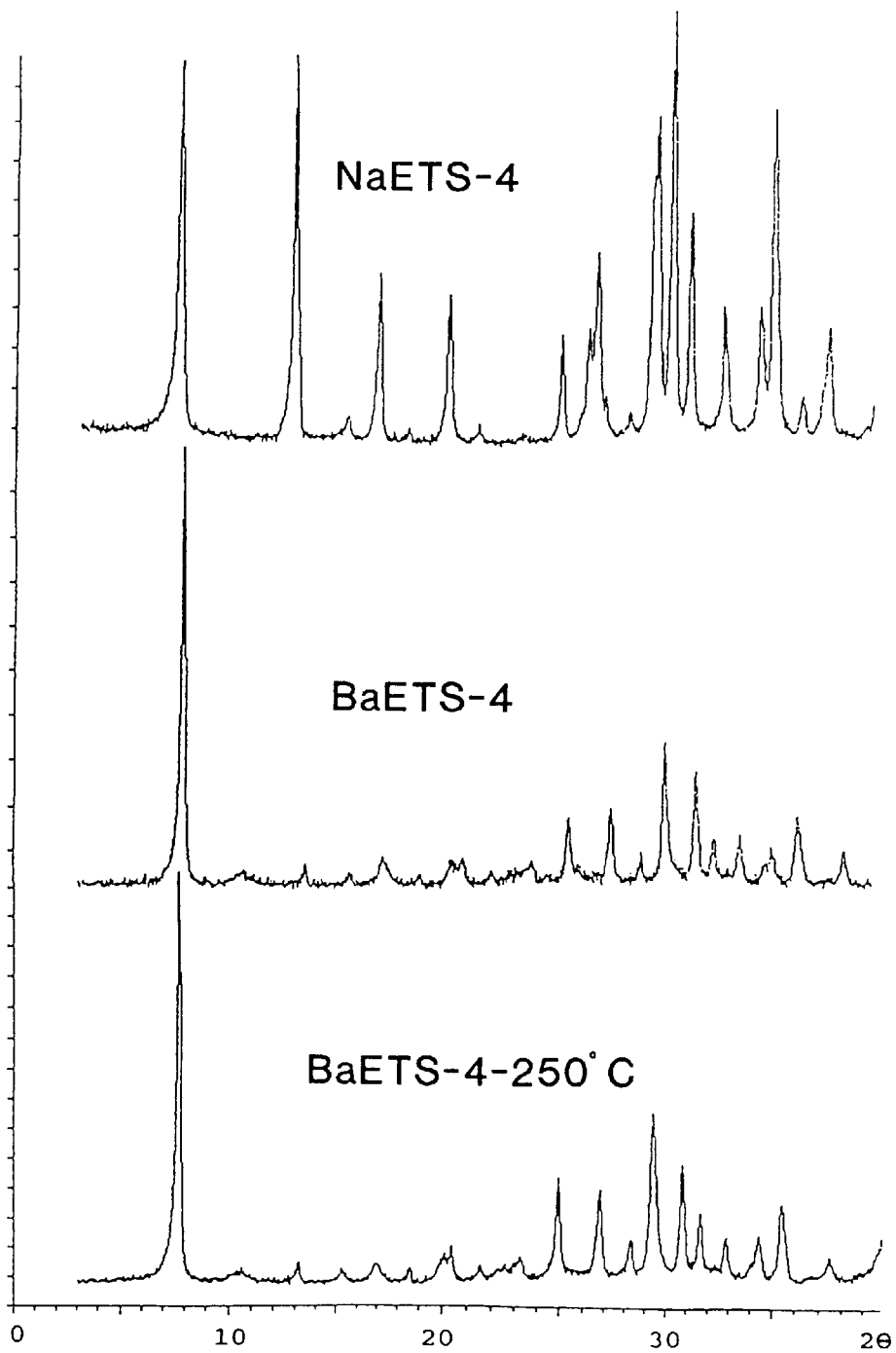
FIGURE 2 : XRD OF NaETS-4, BaETS-4 and BaETS-4 THERMALLY TREATED AT 250C

SEPARATION OF NITROGEN FROM MIXTURES THEREOF WITH METHANE UTILIZING BARIUM EXCHANGED ETS-4

BACKGROUND OF THE INVENTION

Discovery of molecular sieves containing octahedral framework chains represents an important new branch of molecular sieve science. Reference is made to U.S. Pat. No. 4,853,202 and U.S. Pat. No. 4,938,939 (Kuznicki et al).

ETS-4 described in U.S. Pat. No. 4,938,939, the entire disclosure of which is herein incorporated by reference, is a small-pored titano-silicate molecular sieve containing such chains. However, ETS-4 is characterized by poor thermal stability in the predominantly sodium exchange form in which it is typically synthesized, generally losing substantial structure and porosity near its dehydration temperature of approximately 200° C. However, it is known, as described in U.S. Pat. No. 4,938,939 that ETS-4 in certain cation forms such as rare earth has a higher degree of thermal stability, at least 400° C. or higher.

Water must generally be removed from a molecular sieve zeolite before it can be effectively employed as a sorbent. It is obvious that a dehydrated sieve will have limited utility as a sorbent unless it is stable at and beyond the temperatures at which it is dehydrated.

It has now been discovered that barium-exchanged ETS-4 not only has a high degree of thermal stability, but can be effectively used to separate nitrogen from a mixture of the same with methane.

SUMMARY OF THE INVENTION

This invention is concerned with a barium-exchanged ETS-4 wherein ETS-4 is contacted with a suitable inorganic salt of barium, particularly barium chloride, in order to replace at least 30% of the original cations, more preferably at least 60% and even more preferably 80% or more.

Contacting ETS-4 with an inorganic barium salt, particularly barium chloride, is carried out in a conventional manner using ion exchange techniques well known in the art. The barium-exchanged ETS-4 is then dehydrated by heating to a temperature of about 150–450° C. for a period of time ranging from about ½ to 96 hours or more.

The barium-exchanged ETS-4 of this invention effectively separates nitrogen (about 3.6 Angstroms) from methane (about 3.8 Angstroms). It is to be noted that the barium ETS-4 treated at temperatures from about 150° C. to about 450° C. demonstrates adsorptivity towards both nitrogen and methane, but the rate of nitrogen adsorption is much faster than the rate of methane adsorption at 1 atmosphere, typically 5–50 times as great. Also, being a synthetic molecular sieve, adsorptive properties are much more predictable and do not vary from sample to sample as seen in nitrogen/methane adsorbents of the prior art which are based on highly variable natural zeolites.

The presently preferred process is the separation of nitrogen from methane, particularly nitrogen from natural gas wells.

As pointed out in U.S. Pat. No. 5,669,958, a significant percentage of U.S. natural gas reserves contain more than 4% nitrogen. The bulk of these reserves cannot be exploited because no economical technology exists for removing the nitrogen.

Cryogenic distillation is the only process being used to date on any scale to remove nitrogen from methane in natural or associated gas. Cryogenic plants are not used more widely because they are expensive and complicated.

There has been mention of the use of natural zeolites such as clinoptilolites in the various cationic forms for the removal of nitrogen, i.e., see U.S. Pat. No. 4,964,889. The fact remains that there is a need for an improved process of separating nitrogen from methane, particularly from natural gas wells, utilizing molecular sieve technology.

BRIEF DESCRIPTION OF THE DRAWINGS

FIG. 1 is a graph plotting the adsorption of methane and nitrogen over a barium-exchanged ETS-4 which had been calcined at 250° C. in a VTI Corporation gravimetric adsorption system for 16 hours under vacuum. From this figure it is clear that at 1 atm and 25° C., while nitrogen equilibrates in a matter of seconds, methane still has not equilibrated in 10 minutes. The relative rate of nitrogen adsorption is many times faster than that of methane.

FIG. 2 is a graph of powder XRD patterns of as-synthesized NaETS-4, barium-exchanged ETS-4 dried at 100° C. and barium-exchanged ETS-4 calcined at 250° C. These are presented in order to show the pronounced change that barium exchange induces in the XRD pattern.

DESCRIPTION OF PREFERRED EMBODIMENTS

The barium-exchanged ETS-4 of this invention is prepared by contacting ETS-4 with an inorganic salt of barium in order to effect the desired exchange.

The ETS-4 which is used as the starting material can be prepared in accordance with the teachings of U.S. Pat. No. 4,938,939 wherein halide-containing reagents areused or it can be prepared from reaction mixtures which are free from halide containing reactants in a manner analogous to the preparation of ETS-10 set forth in U.S. Pat. No. 5,453,263, the entire disclosure of which is incorporated herein by reference.

When used as a sorbent, it is desired to incorporate barium ETS-4 with another material resistant to the temperatures and other conditions employed in separation processes. Such materials include inorganic materials such as clays, silica and/or metal oxides. The latter may be either naturally occurring or in the form of gelatinous precipitates or gels including mixtures of silica and metal oxides. Normally, crystalline materials have been incorporated into naturally occurring clays, e.g., bentonite and kaolin, to improve the crush strength of the sorbent under commercial operating conditions. These materials, i.e., clays, oxides, etc., function as binders for the sorbent. It is desirable to provide a sorbent having good physical properties because in a commercial separation process, the zeolite is often subjected to rough handling which tends to break the sorbent down into powder-like materials which cause many problems in processing. These clay binders have been employed for the purpose of improving the strength of the sorbent.

Naturally occurring clays that can be composited with the crystalline titanium silicate described herein include the smectite and kaolin families, which families include the montmorillonites such as sub-bentonites and the kaolins known commonly as Dixie, McNamee, Ga. and Florida or others in which the main constituent is halloysite, kaolinite, dickite, nacrite or anauxite. Such clays can be used in the raw state as originally mined or initially subjected to calcination, acid treatment or chemical modification.

In addition to the foregoing materials, the crystalline titanium silicate may be composited with matrix materials such as silica-alumina, silica-magnesia, silica-zirconia, silica-thoria, silica-berylia, silica-titania as well as ternary compositions such as silica-alumina-thoria, silica-alumina-zirconia, silica-alumina-magnesia and silica-magnesia-zirconia. The matrix can be in the form of a cogel. The relative proportions of finally divided crystalline metal organosilicate and inorganic oxide gel matrix can vary widely with the crystalline organosilicate content ranging from about 1 to 90 percent by weight and more usually in the range of about 2 to about 50 percent by weight of the composite.

The present invention can be performed by virtually any known adsorption cycle such as pressure swing (PSA), thermal swing, displacement purge, or nonadsorbable purge (i.e., partial pressure reduction). However, the process of the present invention can be advantageously performed using a pressure swing cycle. Pressure swing cycles are well known in the art.

If it is desired to separate nitrogen from methane, then it is desirable to utilize a pressure swing type process at a temperature and pressure effective for adsorption and desorption of nitrogen, with the temperature being preferably maintained in the range of from about −50° to +100° C., and more preferably from 0° to 70° C., the pressure during adsorption being from about 20 psia to 2000 psia, and preferably about 100–1500 psia and more preferably from 500–1000 psia, and the pressure during desorption being lower than during adsorption and effective to cause the desorption of nitrogen, preferably from about 0.1 torr to 150 psia, more preferably from about 0.1 torr to 50 psia and most preferably from about 0.1 torr to 25 psia. The cyclic process can comprise additional adsorption and regeneration steps as well as intermediate depressurization and purging steps.

EXAMPLE 1

Preparation of ETS-4

An alkaline titanium silicate gel was prepared. A sodium silicate solution was prepared using N-Brand (28 wt. % $SiO_2$, 9 wt % $Na_2O$) and caustic (38 wt. % $Na_2O$ solutions. A separate titanic sulfate solution was prepared using titanic sulfate (10 wt % $TiO_2$, 38 wt. % $H_2SO_4$), sulfuric acid, and deionized water. The sodium silicate and titanic sulfate solutions were mixed together using a high shear mixer forming a gel. The final pH of the undiluted gel was 11.5. Molar ratios of the gel composition are listed below. The gel was autoclaved at autogenous pressure in an unstirred Teflon lined vessel for 5 hours in an oven preheated to 230° C., then quenched in cold water. The white crystallized product was settled to the bottom of the autoclave liner under a clear supernatant liquid. The desired solid product was filtered and washed with deionized water to remove undesired salt byproducts, then dried at 115° C. for 1 hour at ambient pressure in air.

Molar ratios used in the synthesis gel of ETS-4

| Si/Ti | $H_2SO_4$/Ti | $Na_2O/H_2SO_4$ | moles Ti/1000 g gel |
|---|---|---|---|
| 3.00 | 3.474 | 1.371 | 0.220 |

Elemental analysis of the resultant crystalline ETS-4 produced the following results by X-Ray Fluorescence analysis:

| | Wt. % |
|---|---|
| $SiO_2$ | 53.1 |
| $TiO_2$ | 27.0 |
| $Na_2O$ | 19.6 |
| $K_2O$ | 0.06 |

EXAMPLE 2

Preparation of barium-exchanged ETS-4

The product from Example 1 was exchanged to the barium ETS-4 form using a ratio of 1 g NaETS-4: 3 g $BaCl_2$: 30 g $H_2O$, then washed with 90 g $H_2O$. This was repeated 2 more times per sample.

Elemental analysis of the above material produced the following results:

| | Wt. % |
|---|---|
| $SiO_2$ | 43.4 |
| $TiO_2$ | 22.1 |
| BaO | 33.5 |
| $Na_2O$ | 0.44 |
| $K_2O$ | 0.06 |

As can be seen from the above example, more than 95% of the original Na of the as-prepared ETS-4 of Example 1 was removed by this barium exchange process.

The above material had an XRD pattern as set forth in Table 1 after heating overnight at 250° C. This pattern is representative of BaETS-4 materials in general.

TABLE 1

| d-spacings (Angstroms) | 100 $I/I_o$ |
|---|---|
| 11.43 | 100 |
| 8.47 | 3 |
| 6.71 | 9 |
| 5.77 | 4 |
| 5.22 | 6 |
| 4.76 | 2 |
| 4.44 | 6 |
| 4.35 | 11 |
| 4.12 | 6 |
| 3.84 | 7 |
| 3.56 | 32 |
| 3.31 | 27 |
| 3.14 | 12 |
| 3.02 | 53 |
| 2.90 | 34 |
| 2.82 | 22 |
| 2.72 | 12 |
| 2.60 | 12 |
| 2.53 | 19 |
| 2.40 | 6 |

The above values and values later mentioned were collected using standard techniques on a Philips APD3720 diffractometer equipped with a theta compensator. The theta compensator maintains a constant area of illumination on the sample, so X-ray intensities obtained from a theta compensated unit are not directly comparable to those of a non-compensated unit. Thus, all values mentioned in the specification and claims with regard to barium ETS-4 were determined by said theta compensated X-ray equipment. The radiation was the K-alpha doublet of copper, and a scintillation counter spectrometer was used. The peak heights, I, and the positions as a function of 2 times theta, where theta is the Bragg angle, were read from the spectrometer chart. From these, the relative intensities, 100 $I/I_o$, where $I_o$ is the intensity of the strongest line or peak, and d(obs), the interplanar spacing in A, corresponding to the recorded lines, were calculated. It should be understood that this powder X-ray diffraction pattern is typical of barium ETS-4 compositions prepared over a wide range of compositions and treatment temperatures (see FIG. 2).

It is noted that the X-ray diffraction patterns set forth in Table 1 contain some differences from the X-ray diffraction patterns set forth in U.S. Pat. No. 4,938,939.

It might very well be that differences in relative intensity and shifts in interplanar spacing result from the replacement of a substantial portion of the original cations with barium.

EXAMPLE 3

The barium ETS-4 from Example 2 was subjected to sorption tests by drying for 16 hours at 250° C. under vacuum in a VTI Corporation sorption apparatus. The rates of nitrogen or methane sorption at 1 atmosphere, 25° C., for periods of time ranging from 0 to 10 minutes are set forth in FIG. 1.

While nitrogen adsorption is complete in a matter of seconds, methane adsorption is still proceeding after 10 minutes. Therefore, the initial rate of nitrogen adsorption is seen to be many times that of methane. In fact, since nitrogen adsorption is essentially complete at a shorter time than we are capable of measuring with confidence, the initial rate selectivity is above our ability to estimate.

As the time period increased, the selectivity of the barium ETS-4 for nitrogen diminished. Nevertheless, the results obtained show that barium-exchanged ETS-4 can be used to selectively remove nitrogen from mixtures of the same with methane, especially in rapid adsorption cycles.

What is claimed is:

1. A process for the separation of nitrogen from a mixture of the same with methane which comprises contacting said mixture with a barium-exchanged ETS-4 wherein the barium represents at least 30% of the exchangeable cations.

2. A process for the separation of nitrogen from a mixture of the same with methane which comprises contacting said mixture with a barium-exchanged ETS-4 wherein barium represents at least 60% of the exchangeable ions.

3. A process for the separation of nitrogen from a mixture of the same with methane which comprises contacting said mixture with a barium-exchanged ETS-4 wherein barium represents at least 80% of the exchangeable ions.

* * * * *